(12) United States Patent
Zecha et al.

(10) Patent No.: US 9,234,819 B2
(45) Date of Patent: Jan. 12, 2016

(54) TESTING DEVICE AND METHOD

(75) Inventors: Stephan Zecha, Hoesbach (DE);
Clemens Schmidgall, Schaafheim (DE);
Mathias Kempf, Krombach (DE); Mark Schulte, Seligenstadt (DE); Adam Swoboda, Gross-Gerau (DE)

(73) Assignee: Continental Safety Engineering International GmbH, Alzenau (DE)

( * ) Notice: Subject to any disclaimer, the term of this patent is extended or adjusted under 35 U.S.C. 154(b) by 261 days.

(21) Appl. No.: 14/001,621

(22) PCT Filed: Feb. 17, 2012

(86) PCT No.: PCT/DE2012/100040
§ 371 (c)(1),
(2), (4) Date: Aug. 26, 2013

(87) PCT Pub. No.: WO2012/113388
PCT Pub. Date: Aug. 30, 2012

(65) Prior Publication Data
US 2014/0014473 A1   Jan. 16, 2014

(30) Foreign Application Priority Data

Feb. 26, 2011   (DE) .......................... 10 2011 012 542

(51) Int. Cl.
*G01N 3/00* (2006.01)
*G01M 17/007* (2006.01)

(52) U.S. Cl.
CPC ........ *G01M 17/007* (2013.01); *G01M 17/0078* (2013.01)

(58) Field of Classification Search
CPC ......... G01N 3/08; G01N 15/0893; B64G 7/00

USPC ................. 73/788, 865.5, 865.3, 1.79, 12.01; 198/617, 793
See application file for complete search history.

(56) References Cited

U.S. PATENT DOCUMENTS

| 6,997,036 B2 * | 2/2006 | Kojima ............. G01M 17/0078 73/12.09 |
| 2005/0155441 A1 * | 7/2005 | Nagata ............. G01M 17/0078 73/865.3 |

(Continued)

FOREIGN PATENT DOCUMENTS

| DE | 102 97 004 | 11/2004 |
| DE | 102008051233 | 5/2009 |

(Continued)

OTHER PUBLICATIONS

JP 09-257633A.*

(Continued)

*Primary Examiner* — Lisa Caputo
*Assistant Examiner* — Nigel Plumb
(74) *Attorney, Agent, or Firm* — W. F. Fasse

(57) ABSTRACT

A device and a method provide for the non-destructive simulation or reproduction of driving situations involving collisions and/or near-collisions between a test vehicle and a target object, while testing driver assistance systems or anticipatory vehicle sensor systems of the test vehicle. The target object is moved along a guide rope, for example by a drive rope. If a load exceeds a threshold value during a collision of the test vehicle with the target object, then the target object decouples from the guide rope.

20 Claims, 4 Drawing Sheets

(56) References Cited

U.S. PATENT DOCUMENTS

2011/0044507 A1* 2/2011 Strauss .............. B60R 21/0134
           382/103
2011/0246156 A1* 10/2011 Zecha ................... G08G 1/166
           703/6

FOREIGN PATENT DOCUMENTS

| DE | 102008025539 | 12/2009 |
| DE | 102008030612 | 12/2009 |
| JP | 09-257633 A | 10/1997 |
| JP | 2008-039686 A | 2/2008 |
| WO | WO 01/73392 | 10/2001 |
| WO | WO 2004/046677 | 6/2004 |

OTHER PUBLICATIONS

PCT Examiner Christian Gruss, International Search Report of the International Searching Authority for International Application PCT/DE2012/100040, mailed Mar. 21, 2013, 3 pages, European Patent Office, HV Rijswijk, Netherlands.

PCT Examiner Agnès Wittmann-Regis, PCT International Preliminary Report on Patentability including English Translation of PCT Written Opinion of the International Searching Authority for International Application PCT/DE2012/100040, issued Aug. 27, 2013, 7 pages, International Bureau of WIPO, Geneva, Switzerland.

German Examiner Jan-Peter Urbach, German Search Report for German Application No. 10 2011 012 542.6, dated Oct. 27, 2011, 5 pages, Muenchen, Germany, with English translation, 5 pages.

* cited by examiner

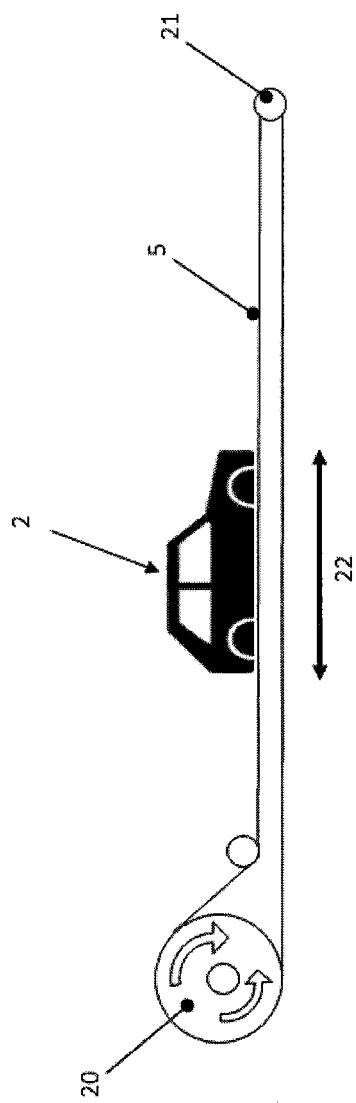

TESTING DEVICE AND METHOD

FIELD OF THE INVENTION

The invention relates to a device and a method for the simulation or reproduction of driving situations, in particular near-collision driving situations and driving situations involving collisions, between a test vehicle and a target object.

BACKGROUND INFORMATION

Driver assistance systems are increasingly being used in motor vehicles. Some of these driver assistance systems serve to protect passengers and further participants in traffic, e.g., pedestrians, cyclists or other vehicles. To this end, the driver assistance systems usually comprise electronic auxiliary devices for monitoring the surroundings in order to be able to suitably assist the driver in particular driving situations, e.g., by means of braking assistance, emergency braking or evasive maneuvers.

Various testing devices are used to test the above-mentioned driver assistance systems, particularly driver assistance systems with so-called anticipatory sensors for monitoring the surroundings of a motor vehicle, wherein, in known testing devices, various test objects are moved across the driving path of the motor vehicle in order to simulate, e.g., a situation in which a pedestrian crosses a road or in which another vehicle crosses the driving path. In order to be able to check or interpret whether or when a driver assistance system initiates an intervention in the dynamics of the vehicle or activates other protective measures in the event of an imminent collision, the test object must stay in the driving path of the motor vehicle until the moment of contact with the motor vehicle or at least until a moment shortly before the moment of contact.

A testing device, particularly for a pedestrian protection system in a motor vehicle, is known from, e.g., DE 10 2008 025 539 A1, wherein a test object is connected to a carriage that can be moved along a crosshead that extends across the driving path of the motor vehicle, wherein the crosshead is arranged at such a height across the driving path of the motor vehicle that the motor vehicle can drive under the crosshead and the test object is thus suspended freely in the driving path of the motor vehicle.

A disadvantage of known testing devices consists in the fact that the test object or the motor vehicle is damaged when driving situations involving collisions are simulated. Moreover, the number of possible applications of known testing devices is very small. Mostly, said known testing devices are stationary devices installed at a test area so that they can be used to simulate a small number of different driving situations only. Another disadvantage consists in the fact that particular natural sequences of movements (e.g., on account of unevenness of the ground) cannot be simulated because of the use of test objects that are freely suspended from a crosshead or a guide rope, and that unrealistic vibrations of the test objects or of the dummies may occur during the test.

SUMMARY OF THE INVENTION

It is therefore the object of the invention to specify a device and a method by means of which various driving situations, in particular near-collision driving situations and driving situations involving collisions between a test vehicle and a target object, can be simulated as realistically as possible, wherein a collision between the test vehicle and the target object—if such a collision occurs—is as non-destructive as possible. Moreover, the device and the method should be as flexible as possible with respect to the simulatable driving situations as well as with respect to the potential sites of application.

Said object is achieved by a device with the inventive device features and by a method with the inventive method features as set forth herein. Advantageous realizations and further developments of the invention are the subject matter of subclaims and further disclosures herein, wherein combinations and further developments of individual features are also possible.

An underlying idea of an embodiment of the invention consists in guiding the target object along a guide rope, wherein the guide rope is arranged as close to the ground as possible so that the target object is transversely guided along the guide rope (which is preferably tightened) as precisely as possible, wherein, in particular, the target object is detachably connected to the guide rope so that the target object will be decoupled from the guide rope in the event of a collision with a test vehicle if a particular load threshold value is exceeded, wherein the target object is preferably decoupled in a non-destructive manner so that the device is immediately reusable and the target object and/or the test vehicle are/is not damaged.

The inventive device comprises a target object, e.g., a dummy vehicle with a box-type body and with rollers/wheels and/or skids, said target object being connected to at least one guide rope. Preferably, the target object is connected to the at least one guide rope in such a manner that the target object is decoupled from the at least one guide rope in the event of a collision between a test vehicle and the target object, wherein the target object will be decoupled from the at least one guide rope particularly if a particular load threshold value is exceeded. For example, the target object may be driven or traversed along the guide rope by means that are provided therefor. To this end, the target object may comprise, e.g., a driving mechanism of its own or be connected to a pulling device.

Preferably, the at least one guide rope is arranged or stretched between at least two fastening devices, wherein, in particular, the at least one guide rope is arranged close to the ground between the at least two fastening devices. "Close to the ground" means that the guide rope is arranged, in its stretched state, short of the respective ground and/or sectionally rests on the ground, e.g., on the travel surface of the pavement on which the inventive device is used. For example, the guide rope may be stretched over a distance of 100 m, 150 m, or more. A tensile force of, e.g., one ton to ten tons may be selected as a tension force for stretching the guide rope. Preferably, the guide rope is arranged at a height of maximally 3 cm above the ground. The inventive device may be used, e.g., at a test area and/or in test halls.

In a preferred realization, the target object is connected to the guide rope by means of a guide clamp. In its closed state, the guide clamp preferably has an eye in which the guide rope is loosely supported so that the guide rope can slide through the eye or so that the guide clamp can be moved along the guide rope. The guide clamp connecting the target object to the guide rope preferably has a mechanism that causes the guide clamp to release the guide rope when the guide clamp is loaded from one or several directions of loading, particularly in the event of a collision between the target object and the test vehicle. As a result of said release, the target object is decoupled from the guide rope. A particular advantage of this realization of the inventive device consists in the fact that no holding parts or no components of a holding device and/or parts of the target object will be left on the guide rope when the target object is decoupled from the guide rope. Such parts or components would otherwise be dangerous, and they constitute an additional risk with known devices, particularly with respect to damages to the test vehicle caused by parts swinging about.

In a further preferred realization of the inventive device, the target object is connected to at least one pulling rope for driving the target object along the guide rope. In particular, the pulling rope may be driven by means that are provided therefor, e.g., by means of a rope drum or a drum winding engine. The target object may be fixedly connected to the at least one pulling rope or particularly in such a manner that the target object is decoupled from the pulling rope in the event of a collision with the test vehicle.

In an advantageous variant of embodiment of the inventive device, the guide rope is arranged or stretched between two fastening devices, which are fixedly connected to the ground. Said fastening devices may be, e.g., eyes arranged in the ground and/or hooks, which, in particular, are fixedly connected to the ground by means of screws, casting compounds and/or anchors.

In an optional realization, at least one of the fastening devices, between which the guide rope is arranged or stretched, is designed as a mobile fastening device. A mobile fastening device may be, e.g., a construction made up of one plate or several plates connected to each other, e.g., metal plates connected to the guide rope by means of, e.g., an eye and/or tensioning device arranged on the fastening device. In particular, ballast may be arranged on the mobile fastening device in order to attain sufficient weight that counteracts the tension force of the guide rope. Optionally, rubber flooring may be additionally arranged between the mobile fastening device and the ground in order to increase frictional adhesion between the fastening device and the ground and thus, in particular, to prevent the mobile fastening device from slipping away and/or in order to facilitate a higher tension force for the guide rope.

In a preferred variant of embodiment of the inventive device, particularly if one or several of the at least two fastening devices are designed as mobile fastening devices, at least one motor vehicle each is arranged as ballast on a mobile fastening device. Preferably, the at least one motor vehicle is connected to the fastening device by means of fastening means, e.g., tension belts.

In a further preferred variant of embodiment of the inventive device, particularly if one or several of the at least two fastening devices are designed as mobile fastening devices and if at least one motor vehicle each is arranged as ballast on the mobile fastening devices, a means for driving the at least one pulling rope is arranged in at least one of the motor vehicles. The means for driving the at least one pulling rope may be, e.g., a rope drum or a drum winding engine. The means for driving may be arranged, e.g., in the luggage trunk or in the rear trunk of the motor vehicle.

In an advantageous variant of realization, at least one driver assistance system or an anticipatory vehicle sensor system, particularly for detecting the surroundings of the motor vehicle, is arranged at least in the test vehicle. The at least one driver assistance system or the anticipatory vehicle sensor system may be, e.g., adaptive light control, assistance system for turning the headlights on full beam and for dimming them for low beam/for high beam, night vision systems, park assist, brake assist or autonomous braking system and/or emergency brake assist, adaptive cruise control, speed control, distance alert, turn assist, traffic jam assist, lane keeping assist, lane keeping support, lane change assist and/or cornering assist. The anticipatory vehicle sensor system, e.g., radar, lidar and/or camera, may particularly serve to activate and/or to precondition active and passive safety systems for passengers and/or other participants in traffic, e.g., airbag, seat belt tensioner or pedestrian protection systems, and/or serve as an anticipatory vehicle sensor system for one or several of the above-mentioned driver assistance systems.

In a further advantageous variant of realization, the target object is provided with one or several attributes that are identified by a driver assistance system or an anticipatory vehicle sensor system as vehicle-specific attributes. This particularly enables individual driver assistance systems of the test vehicle or particular functions of these driver assistance systems to be tested specifically. Said attributes may be, e.g., vehicle headlights, tail lights, stop lights, direction indicators or components such as bumpers, side mirrors, tires, vehicle license plates, radar corner, illustrated plastic films on vehicles, etc.

In a further variant of embodiment, the target object is a dummy vehicle.

In an advantageous realization, the target object is provided with one or several of the following systems:
  a) car-to-car communications system
  b) locating system
  c) reference sensor system
  d) driver assistance system Car-to-car communications systems particularly serve to exchange information between motor vehicles or participants in traffic and are designed to increase the range of vision of the driver of a motor vehicle by electronic means. Such systems can, e.g., indicate emergency braking maneuvers, the presence of ice and aquaplaning as well as assist the driver in performing a lane change maneuver and when he or she wants to join the traffic stream, warn of emergency vehicles driving with their blue lights flashing, and indicate accidents and construction sites.

A locating system may be, e.g., a system that determines the exact position of the target object by means of GPS and, e.g., transmits the information on the position thereof to the test vehicle and/or stores said information for the purpose of the documentation or reproduction of test procedures.

A reference sensor system may be, e.g., a system that determines, stores and/or transmits, at particular instants, the position of the target object, e.g., the position thereof along the guide rope.

A driver assistance system may be, in particular, one of the driver assistance systems listed above, which may be arranged in the test vehicle likewise.

By arranging one or several of the above-mentioned systems in the target object, additional tests of such systems can be carried out by means of the inventive device. It is particularly possible to test driver assistance systems in the test vehicle and/or in the target object that are provided with data of other driver assistance systems or that communicate with driver assistance systems of other vehicles.

In a further variant of embodiment, the target object is connected to the at least one pulling rope at one or several points of attachment, wherein the pulling rope may be, in particular, driven by two synchronized means for driving the at least one pulling rope or arranged, by means of reversing means (e.g., one or several reversing pulleys), in such a manner that it circulates.

When performing an inventive method for the simulation of driving situations between a test vehicle and a target object, in particular near-collision driving situations or driving situations involving collisions, at least one driver assistance system or at least one anticipatory vehicle sensor system arranged on the test vehicle is tested, wherein "testing" means checking or interpreting whether or when a driver assistance system initiates an intervention in the dynamics of the vehicle or activates other protective measures in the event of an imminent collision. In particular, a device according to the above descriptions and explanations is used to this end, wherein the target object is preferably decoupled from the at least one guide rope in the event of a collision between the test vehicle and the target object so that the test vehicle and/or the target object are/is preferably not damaged in the event of a collision, wherein the decoupling operation may be initiated depending on the exceeding of a particular load threshold value in the event of a collision.

In a preferred variant of embodiment of the inventive method, driving situations are simulated on a public highway, e.g., on a public highway that is closed to traffic in order to carry out tests thereon, wherein a realization of the above-described inventive device with mobile fastening devices is preferably used, wherein an advantage consists in the fact that a simulation carried out on a public highway facilitates—in contrast to a simulation carried out at a test area—the simulation of a plurality of different driving situations, wherein it is furthermore possible to carry out said simulation in a realistic manner.

In a further preferred embodiment of the inventive method, the simulated traffic situation is a situation occurring at an intersection, particularly at a public intersection.

A particular advantage of the inventive device and the inventive method over known devices consists in the fact that in spite of the fact that the target object is designed as a light object (e.g., as a dummy vehicle, which usually has only a low own weight), a high tracking stability for the motion of the target object can be attained (particularly within a tracking stability deviation range of smaller than +/−5 cm) due to the fact that the guide rope is arranged or stretched close to the ground with a high tension force, e.g., of up to one ton or up to ten tons. Moreover, a plurality of different driving situations occurring, e.g., on public highways can be simulated or reproduced, and the test vehicle can approach the target object from all directions, i.e., it is possible to simulate both cross traffic and parallel traffic as well as frontal collisions, side-on collisions and rear-end collisions. In particular, the target object can be guided along the guide rope at speeds of up to 80 km/h. Moreover, the device can be used on uneven ground or on a low-quality travel surface, whereby it is particularly possible to realistically simulate or reproduce up- and down-motions of vehicles.

BRIEF DESCRIPTION OF THE DRAWINGS

Further advantages and optional realizations can be inferred from the description and the drawings. Exemplary embodiments are illustrated in the drawings in a simplified manner and explained in greater detail in the following description.

FIG. 4 shows a target object with a pulling rope, said pulling rope being arranged in such a manner that it circulates.

DETAILED DESCRIPTION OF EXAMPLE EMBODIMENTS OF THE INVENTION

Figure 1:
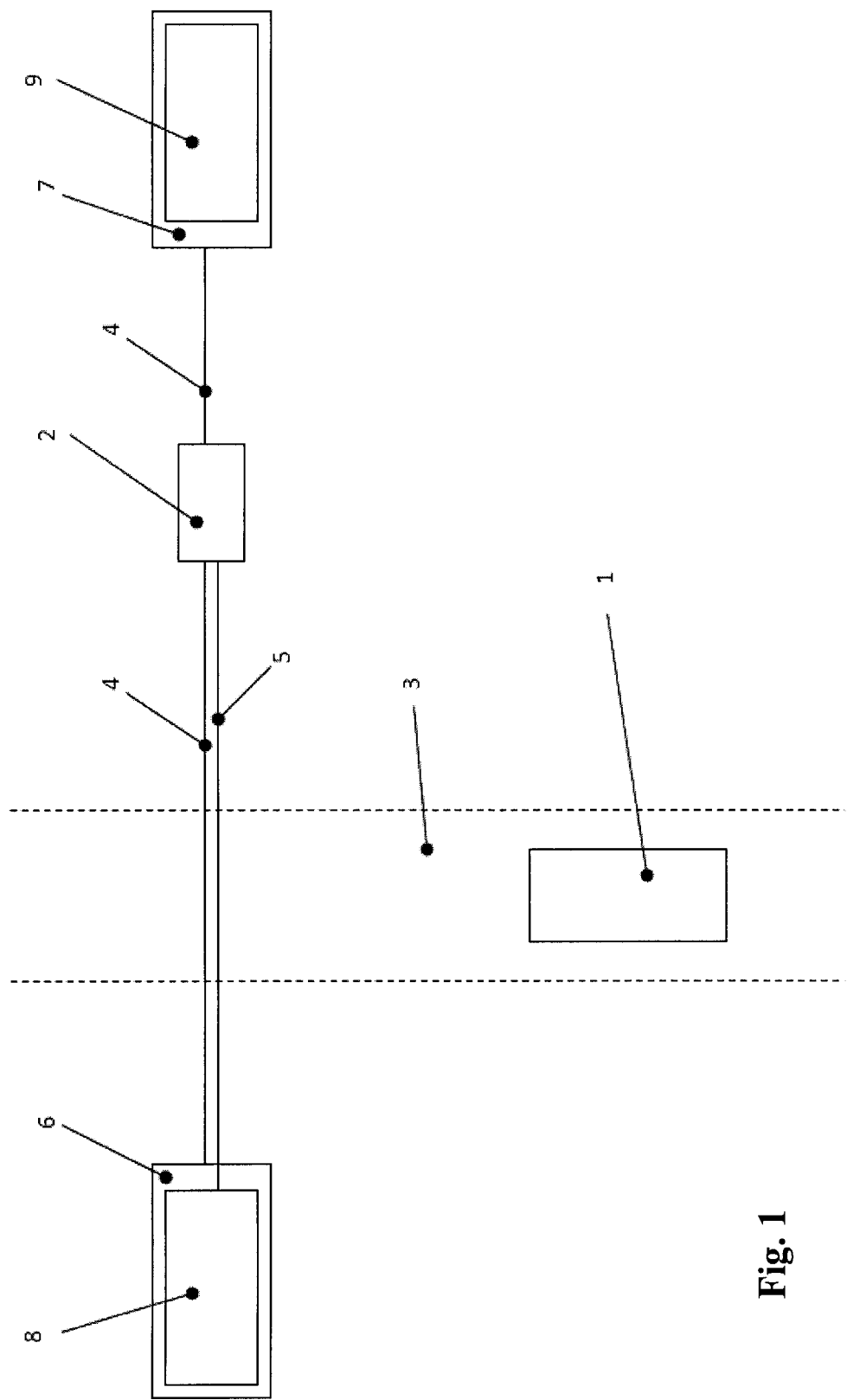
FIG. 1 shows an example of an inventive device/an inventive method.

FIG. 1 shows an example of the design and the functional principle of the inventive device/the inventive method.

Figure 2:
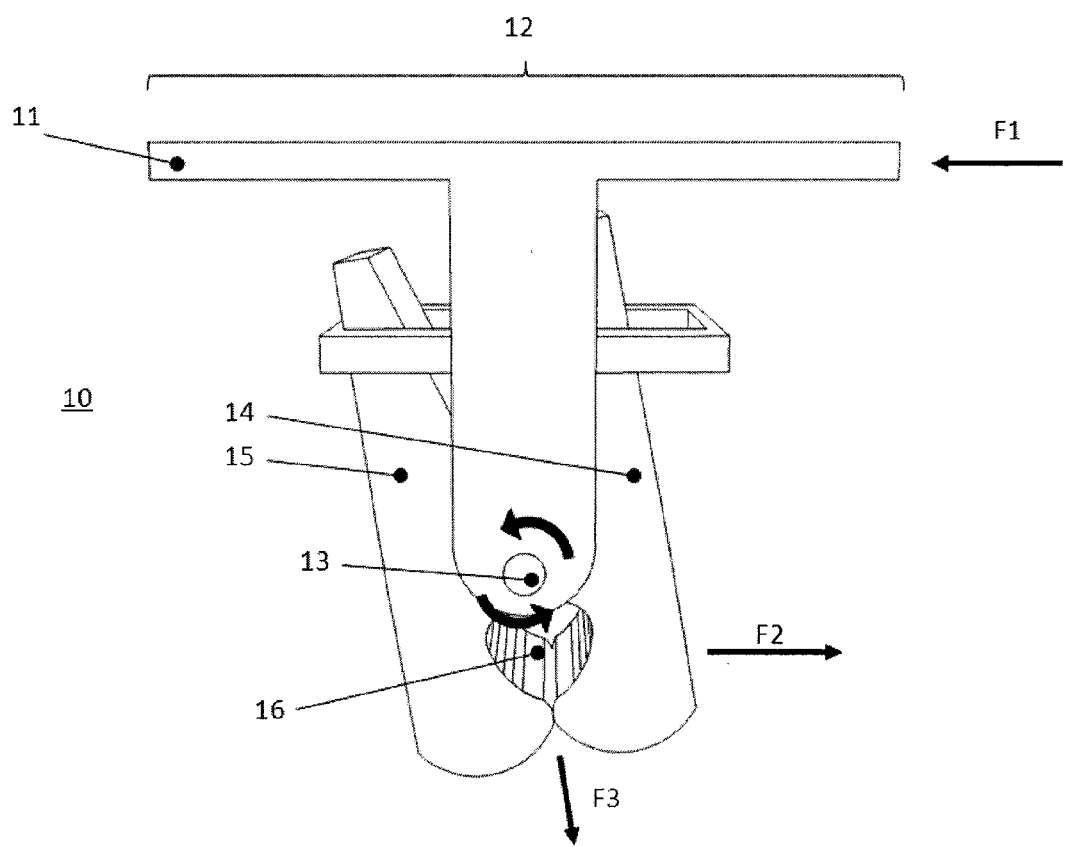
FIG. 2 shows a guide clamp as an example of a connecting element between the guide rope and the target object.

According to FIG. 1, the device comprises a test vehicle 1, which may be a motor vehicle (in particular, a street-legal motor vehicle), and a target object 2. The target object 2 is, e.g., a dummy vehicle. FIG. 1 shows a situation occurring at an intersection. In this situation, the test vehicle 1 and the target object 2 are located on intersecting driving paths. The driving path 3 of the test vehicle 1 (the road on which the test vehicle 1 is located) is indicated by two dashed lines. The target object 2 is connected to a guide rope 4 and to a pulling rope 5. The guide rope 4 is stretched between two fastening devices 6 and 7. The fastening devices 6 and 7 are designed as mobile fastening devices. In the present case, they are designed as plates on which one motor vehicle each 8 and 9 is arranged as ballast. The motor vehicles 8 and 9 are connected to the fastening devices 6 and 7 by means of, e.g., tension belts. In the present case, the motor vehicle 8 on the mobile fastening device 6 comprises means (not shown in FIG. 1) for driving the pulling rope 5, which means may be a rope winch arranged in the opened rear trunk of the motor vehicle 8 and connected to the pulling rope 5. By winding the pulling rope 5 up by means of a rope winch, the target object 2 can be pulled along the stretched guide rope 4 across the driving path 3 of the test vehicle 1. Thus, for testing, e.g., an emergency brake assistance system, which may be arranged in the test vehicle 1, the target object can be moved along the guide rope 4 across the driving path 3 of the test vehicle 1 so that a near-collision driving situation or a driving situation involving a collision between the test vehicle 1 and the target object 2 occurs. In the event of a collision between the test vehicle 1 and the target object 2, the target object 2 will be decoupled from the guide rope 4 if, in particular, a particular load threshold value is exceeded. To this end, the target object 2 is preferably connected to the guide rope 4 by means of a special connecting element. FIG. 2 shows a possible realization of such a connecting element.

FIG. 2 shows a guide clamp 10, which may be used as a connecting element between the target object 2 and the guide rope 4. The guide clamp 10 comprises a T-shaped frame 11 with a section 12, in which a connection (e.g., a screwed connection and/or an adhesive joint) to a target object 2 may be established, and a pivot joint seat 13, around which two clamp halves 14 and 15 are pivotally supported. The clamp halves 14 and 15 can be kept closed by means of, e.g., one or several springs (not shown in FIG. 2) and with a defined tension force/elastic force, wherein in the closed state according to FIG. 2, an eye 16 exists between the clamp halves 14 and 15, in which eye 16 the guide rope 4 may be engaged. In particular, the guide rope 4 is supported in the eye 16 in such a manner that the guide clamp 10 or the target object 2, on which the guide clamp 10 is arranged, can be displaced/guided along the guide rope 4.

FIG. 2 also shows the functional principle of the guide clamp 10 when it is subjected to a load, particularly in the event of a collision between a test vehicle 1 and a target object 2, on which the guide clamp 10 is arranged. In this case, the guide clamp 10 is subjected to a load F1 from the direction of the collision. The guide rope 4 supported in the eye 16 generates a counterforce F2. As a result of the load F1 and the counterforce F2, the clamp halves 14 and 15 rotate around the pivot joint seat 13 in the direction of rotation shown. If a particular load threshold value is exceeded, the guide rope 4 can slip out of the guide clamp 10 in the direction of release F3 so that the target object 2 is decoupled from the guide rope 4, said load threshold value particularly depending on the tension force/elastic force that keeps the clamp halves 14 and 15 closed.

Figure 3:
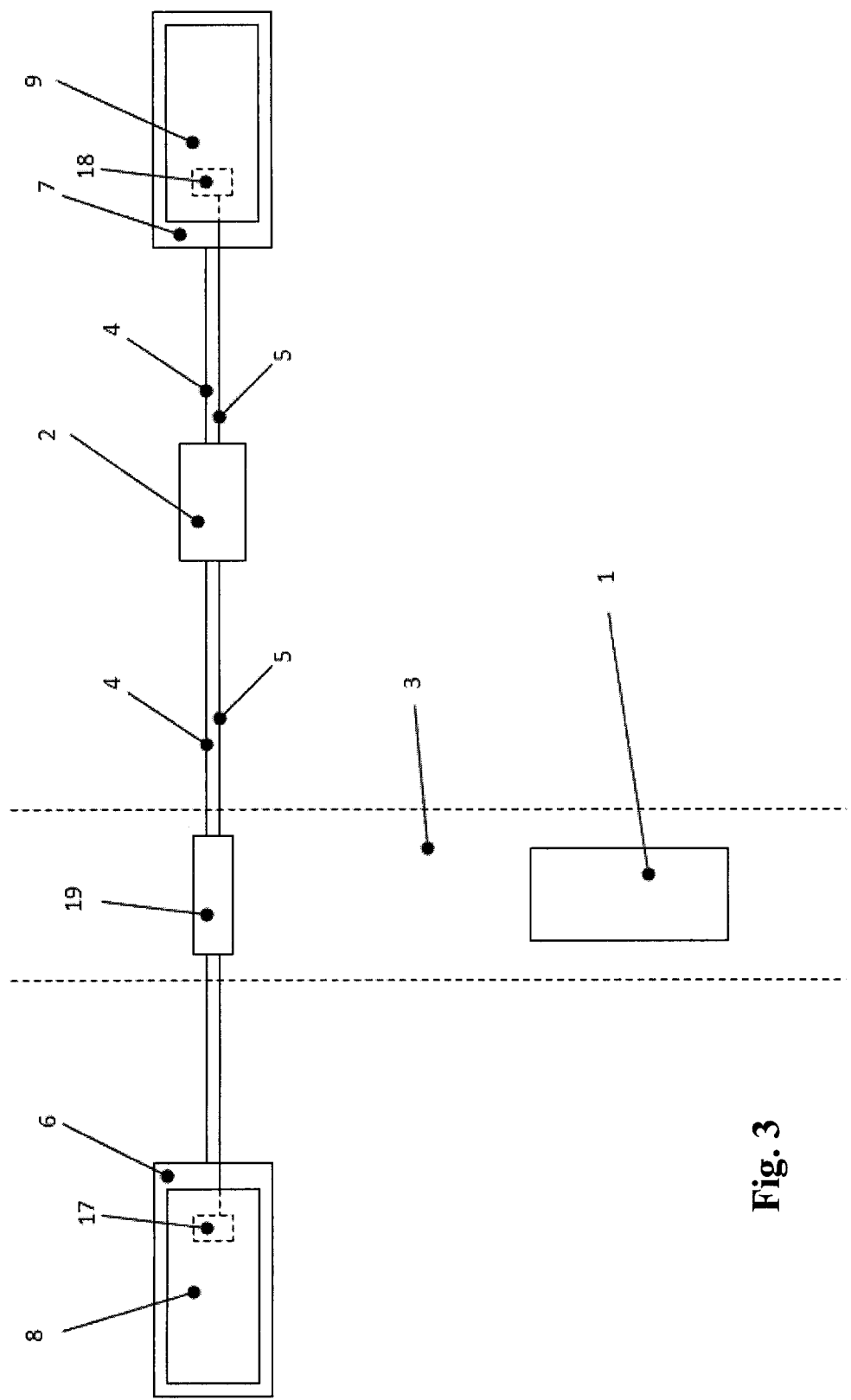
FIG. 3 shows a further example of an inventive device/an inventive method.

FIG. 3 shows a further example of a design and a functional principle of an inventive device/the inventive method, wherein the design and the functional principle correspond to the description of FIG. 1 in large part. In contrast to FIG. 1, FIG. 3 shows the pulling rope 5 being arranged in the target object 2 in such a manner that the target object 2 can be returned, along the guide rope 4, to its starting position (particularly by means of a return winch 18) after the performance of the method/after the simulation of a driving situation between the test vehicle 1 and the target object 2. It is particularly possible to freely traverse the target object 2, along the guide rope 4, between the motor vehicles 8 and 9, e.g., by means of a rope winch 17 arranged in the opened rear trunk of the motor vehicle 8 and by means of the return winch 18. According to FIG. 3, a drive-over ramp 19 may be arranged in the driving path 3 of the test vehicle 1 across the guide rope 4 and/or the pulling rope 5. The drive-over ramp 19 particularly prevents contact between the test vehicle 1 and the guide rope 4/the pulling rope 5 in the event of a driving situation involving a collision or a near-collision driving situation, e.g., when testing an emergency brake assistance system in the test vehicle 1, in which situation the test vehicle 1 is not able to stop in front of the target object 2 in time. In particular, the rope winch 17 and the return winch 18 may be designed in a similar manner or in the same manner and/or may be synchronized in such a manner that the pulling rope 5 is preferably stretched tight at all times.

FIG. 4 shows an example of a target object 2, which can be guided or traversed along a guide rope 4 (not shown in FIG. 4) by means of a pulling rope 5. In this case, the pulling rope 5 is arranged in such a manner that it circulates. To this end, the pulling rope 5 is wound up on a two-part rope drum 20, e.g., by means of a drum winding engine (not shown in FIG. 4), and reversed by means of a reversing pulley 21, whereby the target object 2 can be freely traversed in two directions 22, particularly along the guide rope 4. Moreover, various accelerations and decelerations of the target object 2 can be realized for the simulation of driving situations. By means of additional sensors arranged, in particular, on the rope drum 20, the position of the target object 2 along the path 22 on which it is traversed and/or along the guide rope 4 can be determined at any time.

LIST OF REFERENCE NUMERALS 1 test vehicle
2 target object
3 driving path of test vehicle
4 guide rope
5 pulling rope
6 mobile fastening device
7 mobile fastening device
8 motor vehicle
9 motor vehicle
10 guide clamp
11 frame
12 section for arranging the target object
13 pivot joint seat
14 clamp half
15 clamp half
16 eye
17 rope winch
18 return winch
19 drive-over ramp
20 two-part rope drum
21 reversing pulley
22 traversing directions F1 load
F2 counterforce
F3 direction of release

The invention claimed is:

1. A system for simulation of a driving situation between a test vehicle and a target object, comprising
   a test vehicle provided with a driver assistance system and/or a vehicle sensor system,
   a target object provided with at least one attribute that is identified as a vehicle-specific attribute by the driver assistance system and/or the vehicle sensor system,
   at least one guide rope coupled by a coupling arrangement to the target object such that the target object can move along the guide rope,
   a drive arrangement configured and arranged to drive the target object along the guide rope, and
   at least two fastening devices between which the at least one guide rope is arranged and pretensioned close to a ground,
   wherein the coupling arrangement is configured and arranged such that the target object is decoupled from the guide rope if a load acting on the coupling arrangement exceeds a predetermined load threshold value in a collision between the test vehicle and the target object in order to avoid or minimize damage of the target object and of the test vehicle in the collision.

2. The system according to claim 1, wherein the coupling arrangement comprises a guide clamp, which slides along the guide rope in a coupling state, and which releases the guide rope when subjected to a load exceeding the load threshold value.

3. The system according to claim 1, wherein the drive arrangement comprises at least one pulling rope connected to the target object and adapted to drive the target object along the guide rope, and a rope drive adapted to drive the at least one pulling rope.

4. The system according to claim 1, wherein at least one of the fastening devices is fixedly anchored to the ground.

5. The system according to claim 1, wherein at least one of the fastening devices is a mobile fastening device.

6. The system according to claim 5, wherein the mobile fastening device comprises a base placed on the ground and a motor vehicle arranged as ballast on the base.

7. The system according to claim 6, wherein the drive arrangement comprises at least one pulling rope connected to the target object and adapted to drive the target object along the guide rope, and a rope drive adapted to drive the at least one pulling rope, and wherein the rope drive is mounted on the motor vehicle.

8. The system according to claim 1, wherein the target object is a dummy vehicle.

9. The system according to claim 1, wherein the target object is provided with at least one of the following: a) a car-to-car communications system, b) a locating system, c) a reference sensor system, d) a driver assistance system.

10. The system according to claim 1, wherein the drive arrangement comprises at least one pulling rope connected to the target object at at least two points of attachment and adapted to drive the target object along the guide rope, a rope drive adapted to drive the at least one pulling rope, and rope reversing devices on which the at least one pulling rope circulates.

11. The system according to claim 1, wherein the drive arrangement comprises at least one pulling rope connected to the target object at at least two points of attachment and adapted to drive the target object along the guide rope, and two rope drives that are synchronized with each other and adapted to drive the at least one pulling rope.

12. A method of using the system according to claim 1 for the simulation of a driving situation between the test vehicle and the target object, comprising:
   testing the driver assistance system or the vehicle sensor system provided on the test vehicle,
   operating the drive arrangement to drive the target object along the guide rope, and causing Han the collision of the test vehicle with the target object, and
   decoupling the target object from the guide rope when the load threshold value is exceeded in the collision.

13. The method according to claim 12, performed on a public roadway as the ground.

14. The method according to claim 13, wherein the simulation simulates the driving situation occurring at a roadway intersection of the public roadway.

15. A system for simulating a driving situation involving a collision between a test vehicle and a target object, said system comprising:
   a target object that is supported on and movable along a ground;
   two rope fastening devices that are respectively arranged stationarily at two locations spaced apart from one another on the ground;
   a guide rope that is secured to, extends longitudinally between, and is tensioned between said two rope fastening devices, such that said guide rope is longitudinally immobile between said two rope fastening devices, and such that said guide rope intersects an intended driving path of the test vehicle;
   a releasable coupling that releasably couples said target object onto said guide rope, so that said target object can move along said guide rope when said target object is coupled thereto by said releasable coupling, and wherein said releasable coupling is configured and adapted to release from said guide rope so as to decouple said target object from said guide rope in response to a predetermined load threshold value being exceeded by a load acting on said releasable coupling; and
   a drive arrangement that is operatively connected to said target object, and that is configured and arranged to drive said target object along said guide rope;
   wherein, in a simulated driving situation in which the test vehicle is driven along the intended driving path and undergoes a collision with said target object, when the collision causes the load acting on said releasable coupling to exceed said predetermined load threshold value then said releasable coupling will release from said guide rope and decouple said target object from said guide rope.

16. The system according to claim 15, wherein said guide rope rests on the ground and/or is supported at a height of at most 3 cm above the ground.

17. The system according to claim 15, wherein said releasable coupling is configured and arranged so that after said releasable coupling releases from said guide rope, then no part of said releasable coupling and no part of said target object remain on the guide rope.

18. The system according to claim 15, wherein said drive arrangement comprises a pulling rope connected to said target object, and at least one of a rope winch, a rope drum and a drum winding engine arranged to pull the pulling rope.

19. The system according to claim 15, wherein said releasable coupling comprises a spring-biased clamp that has a slip eye in a closed state of said spring-biased clamp, wherein said slip eye can receive and slide along said guide rope in said closed state, and wherein said slip eye opens in an open state of said spring-biased clamp when said load acting on said spring-biased clamp exceeds said predetermined load threshold value which is established by a spring bias of said spring-biased clamp.

20. The system according to claim 15, wherein at least one of said rope fastening devices is a ballast anchor that is not positively secured to the ground, and that merely rests on the ground and is ballasted with sufficient weight so that said ballast anchor withstands a tension of said guide rope and remains stationary on the ground during the simulated driving situation.

* * * * *

UNITED STATES PATENT AND TRADEMARK OFFICE
CERTIFICATE OF CORRECTION

PATENT NO. : 9,234,819 B2
APPLICATION NO. : 14/001621
DATED : January 12, 2016
INVENTOR(S) : Stephan Zecha et al.

It is certified that error appears in the above-identified patent and that said Letters Patent is hereby corrected as shown below:

In the claims

Column 9,
Line 9, after "causing", delete "Han".

Signed and Sealed this
Twelfth Day of July, 2016

Michelle K. Lee
*Director of the United States Patent and Trademark Office*